Aug. 30, 1932.                    J. A. GREGOIRE                    1,874,505
                        TRANSMISSION DEVICE FOR MOTOR VEHICLES
                              Original Filed Feb. 21, 1929
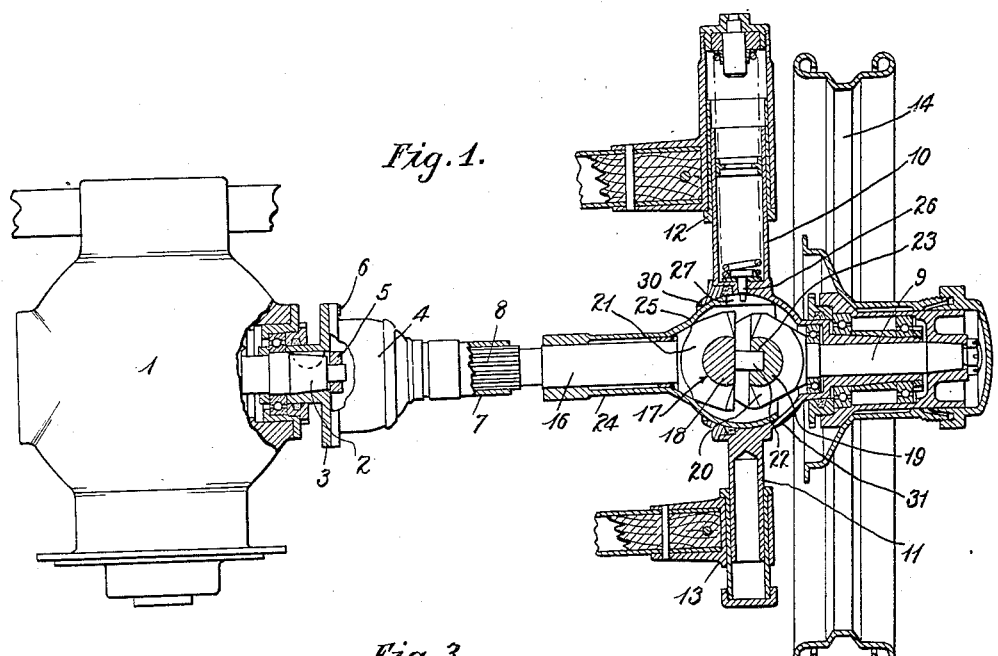
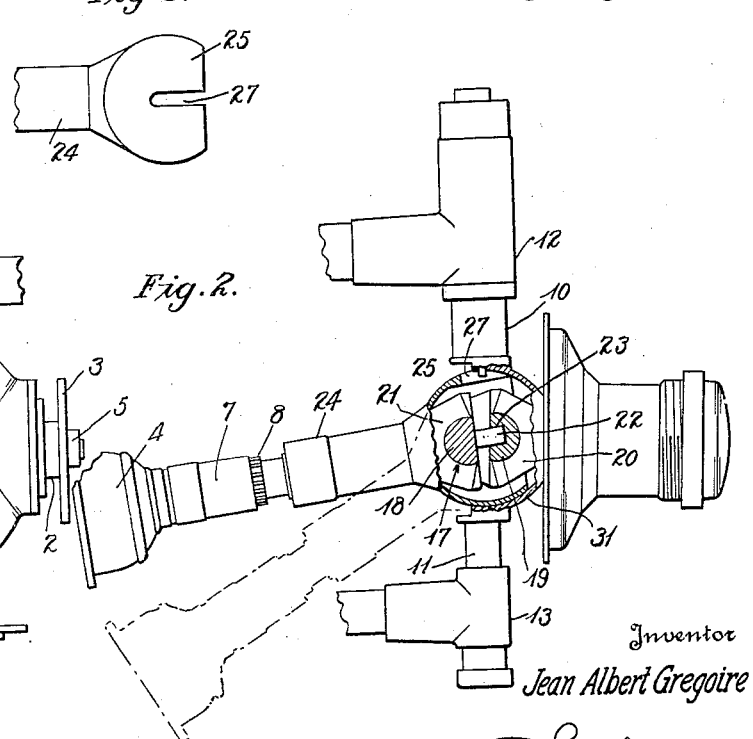
Inventor
Jean Albert Gregoire
Attorneys Patented Aug. 30, 1932

1,874,505

UNITED STATES PATENT OFFICE

JEAN ALBERT GREGOIRE, OF PARIS, FRANCE

TRANSMISSION DEVICE FOR MOTOR VEHICLES

Application filed February 21, 1929, Serial No. 341,798, and in France February 25, 1928. Renewed June 9, 1932.

As is known in the art to which my invention relates, in most automobiles having front wheels employed both for driving and steering, the transmission of power to the front wheels takes place from the front axle by means of shafts provided with several universal joints, of which one is mounted directly at the exit of the shaft, whereas the others are lodged in the hollow wheel journal. Said journal is itself constituted by a hollow sphere in which is fitted after the fashion of a ball and socket joint, a segment of a sphere, which is integral with a tube, inside of which turns the transmission arbor, the spherical segment forming a ball and socket being maintained applied against the inner surface of the journal by a crown screwed thereon, or in other suitable manner.

Such an arrangement possesses the disadvantage that the tube forming a body with the spherical segment forming a ball and socket runs the risk of being carried along in the rotation of the transmission arbor.

According to my invention I eliminate this disadvantage by means of a pin disposed along the vertical axis of the journal, to which it is fixed, and penetrating a slot provided for that purpose in the spherical segment forming a ball and socket. It is obvious that such an arrangement prevents the said spherical segment from being carried along in the movement of rotation of the shaft.

In order that there may be access to the interior of the journal, with a view to allowing dismounting of the transmission arbor, it is necessary to be able to easily separate the spherical segment forming a ball and socket from the body proper of the journal. In this end, after unscrewing the crown which maintains the ball and socket in place, it would be advantageous to be able to immediately disengage the ball and socket from the pin which prevents it from turning. I attain this result, according to my invention, by furnishing a slot which is sufficiently extended, in the ball and socket, for receiving the pin, and preferably clear to the edge of the segment, in order that the pin may disengage said slot when it is desired to remove the ball and socket from the interior of the journal.

This arrangement possesses the advantage, particularly in the case where the transmission joints, that is, joints at the exit of the axle and joints in the journal, are dismountable in place, of allowing easy dismounting and removal of the part of the transmission arbor therebetween, without it being necessary to dismount the journal proper.

I have illustrated diagrammatically by way of example in the accompanying drawing, a particular embodiment of my invention, in the case where the universal joint, lodged in the journal is formed of two spheres, pivoted respectively to two elements of the arbor, and each provided with mortises and tenons having plane faces respectively penetrating each other. The said joint is described and claimed in my copending application Serial No. 237,952, filed December 5. 1927.

In the drawing—

Fig. 1 is a partial sectional view of my complete device taken along the journal and the transmission arbor;

Fig. 2 is a somewhat similar view showing the parts during the assembling operation; and Fig. 3 is a plan view of the spherical segment forming the ball and socket which fits into the journal.

Referring to the drawing more in detail, 1 designates the front axle, 2 the exit arbor thereof which is extended by a universal joint 5 of known type, mounted in a shell 4 placed adjacent the exit of the axle.

The shell 4 is fixed, as usual, on the end of the arbor 2 through the medium of an element 3 keyed thereon and secured to the shell 4 of the so-called joint by means of bolts 6. On the other side of the joint, the transmission arbor is formed by means of a grooved sleeve 7, in which is adapted to slide an element of the shaft 8 which is extended into the interior of the journal by means of a part 16. Said journal is composed of a hollow sphere 31, secured to two vertical tubular elements 10 and 11, sliding and swinging in tubes 12, 13, rigid with the chassis of the vehicle. Suspension elements (not shown) are preferably provided between the tubular elements 10 and 11, on the one hand and the tubes 12 and 13 on the other hand.

The journal which carries the wheel 14 is provided in known manner with devices (not shown) which permit turning thereof in order to steer the vehicle.

The shaft 16 is connected with the arbor element 9 integral with the wheel through a pivotal connection disposed inside the journal and constituted by a universal joint 17. Said universal joint is constituted, for example, by two spheres 18, 19 pivoting respectively in forks 21, 20, carried by the extremities of the arbors 16 and 9, one of said spheres being provided with a plane face tenon 22, and the other with a corresponding mortise 23 the tenon 22 being adapted to penetrate into the mortise 23 for assuring connection and transmission.

On the other hand the arbor 16 is supported by a sleeve 24, extended by a spherical segment 25, which fits in the manner of a ball and socket joint on the interior of a hollow sphere 31 of the journal, hereinbefore mentioned. For maintaining said segment in place in the journal, there is provided a ring 30 which screws into the journal in a way to retain the spherical segment 25.

The sleeve 24 constitutes the supporting bearing of the end of arbor 16. In order to prevent said sleeve from being carried around in the movement of rotation of said arbor, according to my invention, I have provided a vertical pin 26, fixed in any suitable manner to the body of the journal, along the vertical axis thereof, and projecting into the interior of the hollow sphere of the journal. On the other hand, the spherical segment 25 is provided with a slot 27 (Fig. 3), which extends out to the edge thereof, and on the interior of which penetrates the pin 26. Obviously by means of this arrangement, the sleeve 24 which forms part of the spherical segment 25 cannot be carried around in the rotation of the shaft 8, 16, but at the same time that the segment 25 will have sufficient freedom of movement for a certain amplitude by means of the slot 27, on the interior of the segmental sphere of hollow construction 31, for becoming adapted to the movements due to unevenness in the road and the like.

The arrangement described allows an easy dismantling of the transmission line comprised between the element 3 and the joint 17 without it being necessary to remove the journal enclosing the said joint 17.

In this end, the bolts 6 of the joint 3 are first unscrewed. Subsequently the joint 3 and the grooved sleeve 7 thereof is caused to slide on the element of the arbor 8, in a way to disengage the member 5, and the whole is swung toward the bottom into the position shown in dotted lines in Fig. 2. After having unscrewed the ring 30, it is sufficient to draw on the assembly of arbor 8, 16, sleeve 24, and the spherical segment 25 for completely disengaging the journal. During this movement the pin 26 slides in the slot 27 and the tenon 22 becomes disengaged from the mortise 23. The whole assembly consisting of arbor 8, 16, sleeve 24, spherical segment 25, and sphere 18 of the universal joint 17 are then removed as a single unit, said sphere being carried along by the fork 20 thereof. The reverse is brought about for remounting.

While I have described what I deem to be the preferred form of my device, I do not wish to be limited thereto, as there might be many changes made in the form, construction and arrangement of parts without departing from the spirit of my invention as comprehended within scope of the appended claims. In particular, other types of joint than 17, disclosed by way of example, might be readily employed in connection with my device, provided such joints are of the demountable type.

Having described my invention, what I claim as new and desire to secure by Letters Patent is:

1. In a transmission device for the front wheels of a motor vehicle the combination of a transmission arbor, a wheel axle, a universal joint interconnecting said arbor and said axle, a hollow spherical journal for said axle adapted to surround said joint, supporting tubes for said journal, a spherical segment for said arbor adapted to form a ball and socket joint with said spherical journal, and means in one of said tubes adapted to interconnect said journal and said spherical segment for preventing rotation of said segment with said transmission arbor.

2. In a transmission device for the front wheels of a motor vehicle the combination of a transmission arbor, a wheel axle, a dismountable universal joint interconnecting said arbor and said axle, a hollow spherical journal for said axle adapted to surround said joint, supporting tubes for said journal, a spherical segment for said arbor adapted to form a ball and socket joint with said spherical journal, and means in one of said tubes adapted to interconnect said journal and said spherical segment for preventing rotation of said segment with said transmission arbor, said means being adapted to allow separation of said segment from said journal when said universal joint is dismounted.

3. In a transmission device for the front wheels of a motor vehicle the combination of a hollow spherical journal, a universal transmission-arbor joint lodged in said journal, supporting tubes for said journal, a spherical segment adapted to form a ball and socket joint with said spherical journal for supporting one of the sections of said transmission arbor, a slot formed in said spherical segment, and a pin disposed in one of said supporting tubes adapted to engage in said slot, whereby rotation of said segment with said transmission arbor is prevented.

4. In a transmission device for the front wheels of a motor vehicle the combination of a hollow spherical journal, a dismountable universal transmission-arbor joint lodged in said journal, supporting tubes for said journal, a spherical segment adapted to form a ball and socket joint with said spherical journal for supporting one of the sections of said transmission arbor, an open slot formed in said spherical segment, and a pin disposed in one of said supporting tubes adapted to engage in said slot, whereby rotation of said segment with said transmission arbor is prevented and said segment may be separated from said journal when said universal joint is dismounted.

5. In a transmission device for the front wheels of a motor vehicle the combination of a transmission arbor, a wheel axle, a universal joint interconnecting said arbor and said axle, a hollow spherical journal for said axle adapted to surround said joint, supporting tubes for said journal, a spherical segment for said arbor adapted to form a ball and socket joint with said spherical segment, a slot formed in said spherical segment, and a pin disposed in one of said supporting tubes adapted to engage in said slot, whereby rotation of said segment with said transmission arbor is prevented.

6. In a transmission device for the front wheels of a motor vehicle the combination of a transmission arbor, a wheel axle, a dismountable universal joint inter-connecting said arbor and said axle, a hollow spherical journal for said axle adapted to surround said joint, supporting tubes for said journal, a spherical segment for said arbor adapted to form a ball and socket joint with said spherical journal, an open slot formed in said spherical journal, and a pin disposed in one of said supporting tubes adapted to engage in said slot, whereby rotation of said segment with said transmission arbor is prevented and said segment may be separated from said journal when said universal joint is dismounted.

7. In a transmission device, the combination of a transmission arbor, an axle, a universal joint interconnecting said arbor and said axle, a hollow spherical journal for said axle adapted to surround said joint, yielding means supporting the journal, a spherical segment for said arbor adapted to form a ball and socket joint with said spherical journal and means formed integrally with the segment and the journal adapted to interconnect said journal and said spherical segment for preventing rotation of said segment with said transmission arbor.

In testimony whereof I hereunto affix my signature.

JEAN ALBERT GREGOIRE.